United States Patent
Goddard et al.

(10) Patent No.: US 9,892,470 B2
(45) Date of Patent: Feb. 13, 2018

(54) SYSTEM AND METHOD FOR CONFIGURABLE DEPLOYMENT OF TRANSIT AGENCY CONTENT

(71) Applicant: Trapeze Software ULC, Mississauga (CA)

(72) Inventors: Matthew Carl Goddard, Mississauga (CA); Bruce Payne, Kitchener (CA); David Gavin, Dundas (CA); Damian Bown, London (GB)

(73) Assignee: Trapeze Software ULC, Mississauga (CA)

( * ) Notice: Subject to any disclaimer, the term of this patent is extended or adjusted under 35 U.S.C. 154(b) by 441 days.

(21) Appl. No.: 13/861,763

(22) Filed: Apr. 12, 2013

(65) Prior Publication Data

US 2013/0275861 A1 Oct. 17, 2013

Related U.S. Application Data

(60) Provisional application No. 61/623,991, filed on Apr. 13, 2012.

(51) Int. Cl.

| | | |
|---|---|---|
| *G06F 17/30* | (2006.01) | |
| *G06Q 50/00* | (2012.01) | |
| *G06Q 30/02* | (2012.01) | |
| *G06Q 10/10* | (2012.01) | |
| *G06Q 50/26* | (2012.01) | |
| *G06F 17/22* | (2006.01) | |
| *G06Q 10/06* | (2012.01) | |
| *G06Q 50/14* | (2012.01) | |

(52) U.S. Cl.
CPC ......... *G06Q 50/01* (2013.01); *G06F 17/2247* (2013.01); *G06F 17/30893* (2013.01); *G06Q 10/06* (2013.01); *G06Q 10/10* (2013.01); *G06Q 30/0201* (2013.01); *G06Q 50/14* (2013.01); *G06Q 50/265* (2013.01)

(58) Field of Classification Search
CPC ....................................................... G06F 17/30
USPC ....................................................... 715/234
See application file for complete search history.

(56) References Cited

U.S. PATENT DOCUMENTS

| | | | |
|---|---|---|---|
| 6,845,316 B2 * | 1/2005 | Yates | 701/117 |
| 8,024,330 B1 | 9/2011 | Franco et al. | |
| 2002/0171675 A1 * | 11/2002 | Fox et al. | 345/701 |
| 2009/0235149 A1 * | 9/2009 | Frohwein | G06F 17/30867 715/205 |
| 2010/0242121 A1 * | 9/2010 | Johnson et al. | 726/28 |

FOREIGN PATENT DOCUMENTS

WO 2007/120833 10/2007

* cited by examiner

*Primary Examiner* — Kavita Padmanabhan
*Assistant Examiner* — Tionna Burke
(74) *Attorney, Agent, or Firm* — Elan IP Inc.

(57) ABSTRACT

Systems and methods for configurable deployment of transit agency content are provided that allow plug and play functionality modules, based on available transit data required by such functionality modules, to be placed on webpages. Further, content may be developed and published to various transit data sinks from a single dashboard.

13 Claims, 5 Drawing Sheets

Website Builder Tool – Module Configuration

400

☑ Real-time Schedule Info  402

Configurations  404

Inputs
- ☑ Route Selection Textbox
- ☐ # Buses/route to show (default 1)
- ☐ Date (ie allow historical)

Outputs
- ☑ Route Info Box (1/route entered)
- ☑ On time info
- ☑ Next bus info
- ☐ Daily performance stats

Params
- ☑ Fixed Routes
- ☐ Paratransit routes

Font Color
Font Size
Auto-Update?

Current Module UI Preview  406

Real-Time Scheduling Info

Enter Desired Route(s) | 7A, 19 |

Bus 7A: On Time

Bus 19: Late 1 min. Next bus 5 min.

Website Builder Tool – Dynamic Content Handler

Content Type
- ☑ Alert
- ☐ User Content
- ☐ Story
- ☐ Web Page
- ☐ Picture

502

Content Type Parameters
- ☑ Param 1
- ☐ Param 2
- ☑ Param 3
- ☐ Param 4

504

Intended Sinks for Content
- ☑ Agency Sink
- ☑ External Sink
- ☑ Transit Data Sink Type 3

514

*Alert Categories*
Describe your alert, and your preview content will be assembled

- ⊞ ☐ Service Announcements
- ⊞ ☐ Major Disruptions
- ☑ Upcoming Schedule Changes
- ⊞ ☐ Special Events
- ☑ Holiday Shopping Shuttles
- ☐ Free Service Offers
- ⊞ ☐ Transit News
- ⊞ ☐ General Alerts
- ⊞ ☐ Route Alerts

[ Select / Deselect All ]

510

CONTENT PREVIEW

Please be advised that:

There is an upcoming schedule change, which is a holiday shopping shuttle schedule will be in effect.

Please check the route planner.

508

Mediums
- ☑ External Web
- ☐ Other
- ☐ Social Media
- ☑ SMS
- ☐ Intranet

512

STATISTICS
Num Alerts Receivers: 2903
Alert Number: 32098

506

SYSTEM AND METHOD FOR CONFIGURABLE DEPLOYMENT OF TRANSIT AGENCY CONTENT

CROSS-REFERENCE TO RELATED APPLICATION

This application claims the benefit of U.S. Provisional Application No. 61/623,991 filed Apr. 13, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Although many tools exist for building websites, tools for quickly building and maintaining transit websites—and the data and functionality required to make such websites useful for agencies' riders—do not exist. Accordingly the following invention is directed at addressing some of those current limitations.

SUMMARY OF THE INVENTION

In one aspect there is a system for configurable transit agency content management comprising one or more transit data databases containing one or more transit data datasets, one or more functionality modules, each having one or more functionality module user interface components to allow users to interact with the functionality module and processing components for interacting with the one or more transit data databases having datasets required by the functionality module, and each of the one or more functionality modules being configured to interact with one or more transit data databases to provide functionality, and a webpage design module, having a user interface component displaying a webpage, configured to allow one or more of the functionality module user interface components to be placed thereon to create a webpage.

The one or more transit data databases may comprise one or more of route databases, asset databases, schedule adherence databases and trips databases. The one or more functionality modules may comprise one or more of route planning, asset monitoring, schedule adherence and trip planning modules and may be configured to receive parameters relating to the functionality, query one or more transit data databases based on the parameters, and display one or more results of such query.

The webpage design module is configured to determine which functionality modules' functionality module user interface components can be placed thereon. The determination is based on whether the one or more transit databases include the datasets required by the functionality modules and may be made in real-time or before functionality module options are presented to a user.

In a further aspect there is a method for managing transit content, the method comprising selecting a transit content type to create, specifying one or more parameters for the transit content type, determining one or more transit data sinks to receive the transit content, and creating the transit content.

The creating may further comprise generating draft content based on the specifying, and approving the draft content. The method may further comprise picking what mediums should receive the transit content, and publishing the transit content to those mediums.

In a further aspect there is a system for configurable transit agency content management comprising one or more transit data databases containing one or more transit data datasets, one or more functionality modules, each being configured to interact with one or more transit data databases and transit data datasets to provide functionality, each having one or more functionality module user interface components to allow users to interact with the functionality module, and a webpage design module, having a design module user interface component displaying a preview webpage, configured to allow one or more of the functionality module user interface components to be placed thereon to create a webpage.

The webpage design module may be configured to determine which functionality modules' functionality module user interface components can be placed thereon. The determination may be based on whether the one or more transit databases include the transit data datasets required by the functionality modules. The determination may be made in real-time or before functionality module options are presented to a user.

The one or more functionality modules may be configured to receive parameters relating to the functionality, query one or more transit data databases based on the parameters, and display one or more results of such query.

The one or more transit data databases may comprise one or more of route databases, asset databases, schedule adherence databases and trips databases. The one or more functionality modules may comprise one or more of route planning, asset monitoring, schedule adherence and trip planning modules. The one or more functionality modules may be configured to receive parameters relating to the functionality, query one or more transit data databases based on the parameters, and display one or more results of such query.

The design module user interface component has a module selector located thereon, the module selector containing one or more icons representing one of the one or more functionality modules, each icon being selectable or not selectable and wherein, if selectable, the functionality module can be placed on the preview webpage.

In yet a further aspect there is a method for configurable transit agency content management comprising receiving a request to design a webpage for a transit agency by placing one or more functionality modules on a webpage preview, determining what transit datasets the agency has access to, allowing one or more functionality modules, each functionality module requiring one or more transit datasets for operation, to be selected and placed on the preview webpage based on if the determining indicated the agency has access to the transit datasets required by the functionality module.

The method may further comprise placing a functionality module on the webpage preview based on a user action. The method may further comprise receiving customization parameters relating to the functionality module and adjusting the appearance and operation of the functionality module based on the parameters.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 is a screenshot for a configurable transit agency content management system according to a non-limiting embodiment of the present invention; and FIG. 5 is a screenshot for a configurable transit agency content management system according to a non-limiting embodiment of the present invention.

DETAILED DESCRIPTION OF THE INVENTION

Figure 1:
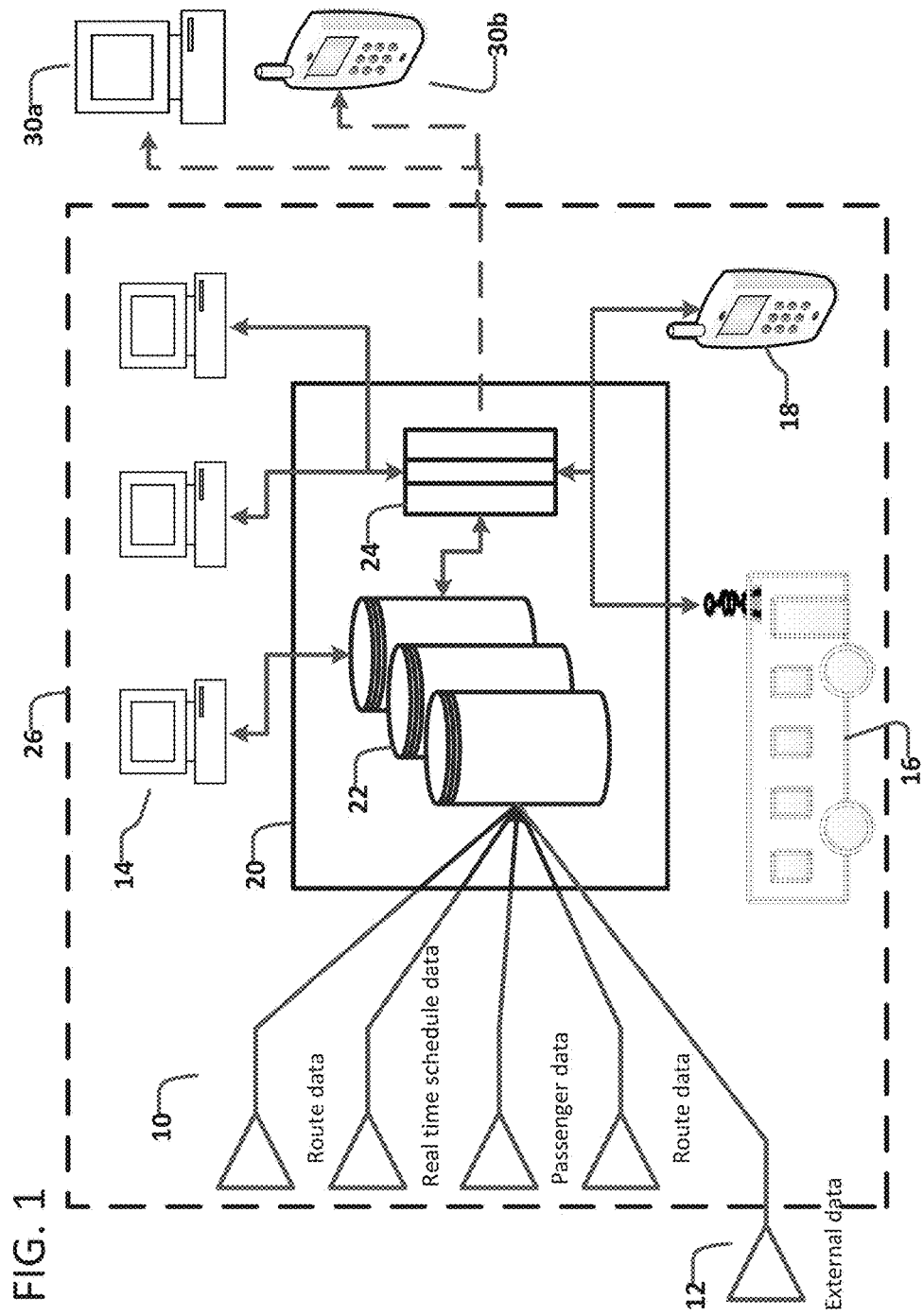
FIG. 1 is a diagram of a system for configurable transit agency content management according to a non-limiting embodiment of the present invention.

FIG. 1 is a diagram of a system for configurable transit agency content management according to a non-limiting embodiment of the present invention.

Transit agency 26 may have one or more data sources 10 that are controlled by the agency and one or more external data sources 12 (such as weather data, general traffic data, GIS data, and the like, that may not be controlled by agency 10). Transit agency 26 further may have one or more vehicles 16 and mobile devices 18 (that may be tablets, phones, etc and may be used by drivers or located on vehicles, etc). Transit agency 26 may also have one or more computing devices 14 that may be used by schedulers, content handlers, supervisors, maintenance staff, and other employees and contractors of the agency.

Transit agency 26 may further have transit agency data sinks or content sinks, that may include user devices 30a/30b and may also include computing devices 14, vehicles 16 and mobile devices 18. Such transit data sinks may receive content from agency 26, such as via websites, social media, SMS messages and the like as described herein.

Transit agency 26 may further have one or more transit data databases 22 (TDD) and transit data servers 24 (TDS) that may interact with TDD 22 to read and write data to perform functionality required by agency 26, and to be provided to transit data sinks Transit data sources and sinks may interact with TDD 22 directly or through one or more TDS 24. Exemplary TDDs 22 may include route databases, asset databases, schedule adherence databases, maintenance databased, user profiles databases, alert category databases, and trips databases. Of course each of these may have many datasets and each may be combined with one another as needed or desired, for performance issues for example.

Figure 2:
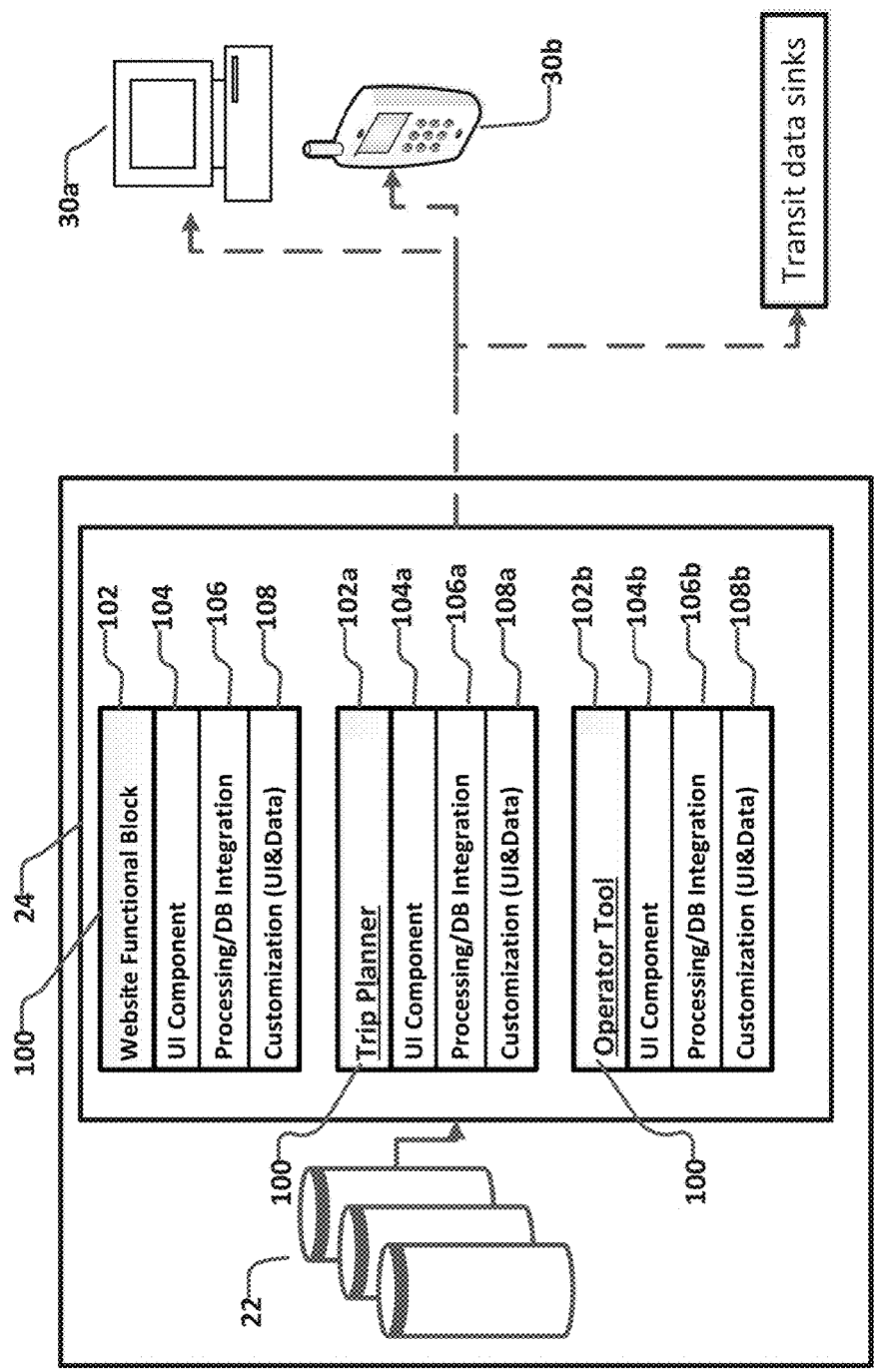
FIG. 2 is a further diagram of a system for configurable transit agency content management according to a non-limiting embodiment of the present invention.

FIG. 2 is a further diagram of a system for configurable transit agency content management according to a non-limiting embodiment of the present invention.

TDS 24 may have one or more functionality modules 100. Each module may provide different functionality that one or more transit data sinks may need, such as trip planning, service advisories, elevator status (for wheelchair access to transit locations), system maps, client registration and alert configuration, alerts and notification generator and publisher (for example for agency employees such as schedulers or content managers), demand response functionality (such as booking trips, paying for trips, and the like).

Each module may have an identifier 102 one or more UI components 104, processing/TDD integration components 106 (PTDDIC), and customization parameters 108. Identifier may simply identify module 100.

UI components may be the way transit data sinks will see the functionality (size, look, feel, what data is displayed, and through what techniques such as screen shots for web pages, text for SMS messages, the social media view, etc). UI components may be different for each transit data sink that may use such functionality (such as based on screen size, audience, etc, and based on specified parameters).

PTDDIC 106 may allow TDS 24 to interact with TDD 22 to access the data (such as transit datasets) required for the functionality and may further provide the data processing and business logic to carry out the functionality of module 100 (such as accepting inputs from users or the agency to describe the functionality or data requested, building queries to TDD 22, getting the data out of TDD 22, and processing and returning the results to be displayed). For example, module 100 may be a service advisory alert. Data source 10 may provide data to TDD 22 to indicate that bus stop 492A is not operable due to construction and has been moved to a temporary stop 492T. Service advisory module 100 may then query TDD 22 to see what stops, if any, are currently affected. Receiving back "492A has been moved to 492T", service advisory module 100 may determine which routes may be affected (possibly via interacting again with TDD 22), determine what transit data sinks may be affected, which forms of publishing may be required (such as websites, social media, SMS, etc—where such may be based, for example, on how major the service disruption is, as may be determined by module 100), and which specific users have requested to receive service advisories. Various UI components 104 may then be invoked to publish the service advisory as required.

It is to be understood that modules 100 may be provided pre-programmed to operate when the proper transit database and/or dataset is available to the module requiring it. As such, functionality and modules may be considered plug and play—not requiring major technology development to implement new features for transit data sinks.

Customization parameters may allow a user to specify exactly what data can be served to riders or other transit data sinks, and how that should look and operate.

It should be noted that various modules 100 may be present at agency 26 and may be useable if the proper data is obtained from data sources 10 (and/or stored in TDD 22), as described herein. Further, performance or accuracy of modules 100 may be increased as more data is obtained. For example, if no real-time data is ingested by TDD 22, then a module 100 providing real-time schedule information cannot be used. As such, screenshot 300, and operator module 100, may begin by querying TDD 22 to determine what modules 100 may be offered based on data sources 10 that are available (or possibly were available).

Operator tool module 100 may allow an operator at agency 26 to handle transit data and functionality, such as selectively publishing content, making functionality available to transit data sinks, and the like. Portions of operator tool module 100 may be substantially as shown in FIGS. 3-5.

Figure 3:
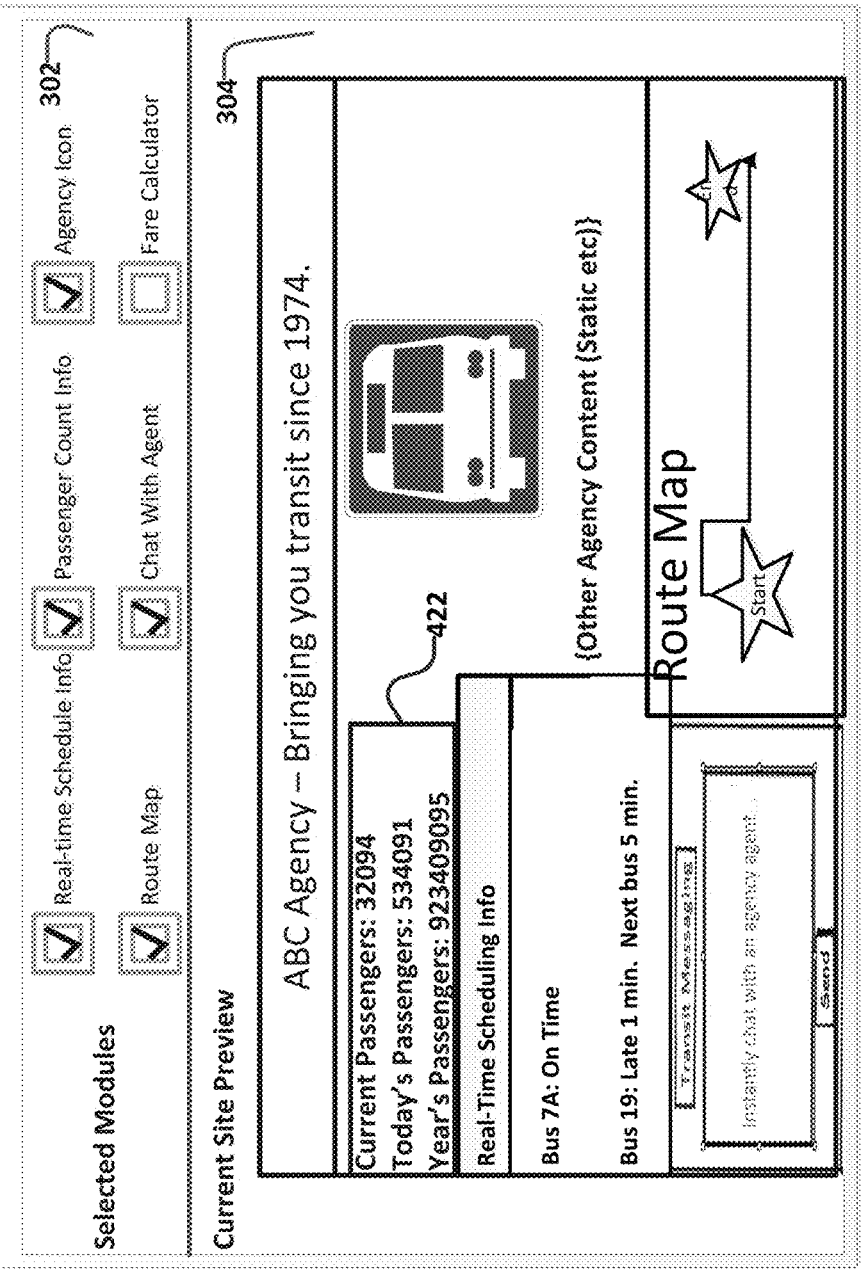
FIG. 3 is a screenshot for a configurable transit agency content management system according to a non-limiting embodiment of the present invention.

FIG. 3 is a screenshot 300 for a configurable transit agency content management system according to a non-limiting embodiment of the present invention, which may be described as a webpage design module, or a part thereof.

In FIG. 3, a user of module 100 may be able to select which modules 100 to expose on a web site (external or intranet) of agency 26, via module selector 302. Preview portion 304 may provide a preview of the particular page of the website, as determined by the modules selected in module selector 302, parameters specified (as described herein), by dragging and dropping UI components of the various modules (not shown, but substantially as dragging and dropping is known in the art).

Module selector 302 may include all modules 100 that may be available in general, or may include all modules 100 that may be available to agency 26 based on, for example, the data sources that provide data or datasets to one or more TDD 22. When more data sources 10/12 are plugged into TDD 22 (such as via a "plug and play" type of arrangement), or more TDD 22 become accessible, more functionality modules 100 may become available—resulting in more icons in module selector 302, or more icons being selectable. Such determinations of which functionality can be offered may be made in real-time upon accessing screenshot 300 (such as by querying TDD 22 on the back end before showing screenshot 300).

FIG. 4 is a screenshot 400 for a configurable transit agency content management system according to a non-limiting embodiment of the present invention.

In FIG. 4, further configuration of a particular module may be possible. Module ID 102 may be shown in module name field 402, with configurations for such module shown and selected in configurations screen 404. A user of this screenshot (which may be a transit operator, for example) can select which user inputs to allow (route selection textbox being selected in FIG. 4), which outputs will be provided on the UI component (daily performance stats not being shown), parameters to specify (such as whether to include fixed routes and/or demand response routes when searching for real-time schedule information), and aspects of font and other parameters. Of course the parameters and configurations shown are exemplary only. Different parameters may be possible for the module 100 shown, and for other modules, as required, and between different transit data sinks Such parameters may affect the specific data from TDD 22 that may be required or accessible by transit data sinks (such as riders). Some parameters may not be available too, if the required data is not present in TDD 22.

Screenshot 400 may be used to alter the currently displayed UI component for a given functionality module 100, which may result in changes to the web page in screenshot 300 (if such module 100 was part of the web page). It is thus to be understood that users can alter parameters (inputs, outputs, fonts, etc) and view all effects such may have.

FIG. 5 is a screenshot 500 for a configurable transit agency content management system according to a non-limiting embodiment of the present invention. Screenshot 500 may then allow a user to add content (where 'content' may be considered transit content), or publish content, to one or more sources for consumption by transit data sinks, and may assist in generating the desired content based on data from data sources 10/12 (as described herein). Screenshots may also be considered 'dashboards', providing main landing places providing an overview of particular features or functionality.

A user of screenshot 500 may be an operator or content administrator for agency 26. The functionality depicted and described may form part of operator module 100.

The user may specify what type of transit content they wish to publish in content specifier 502 and may then be allowed to define some parameters about that content type in 504 (such as alert priority, picture size, web page expiry date/time, and the like). Screenshot 500 may then provide UI features to allow the user to develop or create the content. In the present example, an alert is selected in 502, causing alert categorization 510 and alert preview 508 to display on screenshot 500. The user may then specify elements that define the alert; such defining may allow alert preview 508 to display auto-generated content, draft content, that alert module 100 (and in particular PTDDIC 106) provides to operator module 100 for display in a content preview portion of screenshot 500. A user may amend the draft content and/or approve or accept it for publishing.

Using content mediums 512 and sink target 514 a user may select which media to publish the content to and which transit sinks should receive the content, respectively. Such selections may dictate statistics about who will, or may, receive or view the created transit content.

It is to be further understood that one of modules 100 may allow users (such as riders) to select which content they wish to receive or be made aware of. In doing so they may "subscribe" to various content types having various parameters or categories. This may also form part of generating the statistics about who will receive or view the created content in 506.

It will be apparent to one of skill in the art that other configurations, hardware etc may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

What is claimed is:

1. A system for configurable transit agency content management comprising:
   one or more transit data databases containing one or more transit data datasets;
   a computer system comprising a processor, computer-executable instructions stored on a non-transitory computer-readable medium, and one or more data servers comprising:
   one or more functionality modules, executed by a computer processor, each being configured to interact with one or more transit data databases and transit data datasets to provide functionality, each having one or more functionality module user interface components to allow one or more transit data sinks to interact with the functionality module and wherein the functionality module user interface components are be different for each of the selected transit data sinks, based on the screen size of the transit data sink, a user of the transit data sink and one or more customization parameters; and
   a webpage design module, executed by the computer processor and configured to i) allow an operator of the webpage design module to design a preview webpage for the one or more transit data sinks by selecting one or more functionality module user interface components via a module selector, such preview webpage being visible only in a preview portion of a design module user interface and not being exposed to the one or more transit data sinks, and ii) publish a webpage, based on the preview webpage, that is exposed to the one or more transit data sinks, the webpage design module comprising a design module user interface component comprising the preview portion displaying a preview webpage and a sink target user interface component configured to allow the operator to select the one or more transit data sinks that should receive the webpage, and the module selector configured to allow an operator to select one or more of the functionality module user interface components to be placed on the preview webpage in order to publish the webpage.

2. The system of claim 1 wherein the webpage design module is configured to determine which functionality modules' functionality module user interface components can be placed thereon.

3. The system of claim 2 wherein the determination is based on whether the one or more transit databases include the transit data datasets required by the functionality modules.

4. The system of claim 3 wherein the determination may be made in real-time or before functionality module options are presented to the operator.

5. The system of claim 4 wherein the one or more functionality modules may be configured to receive parameters relating to the functionality, query one or more transit data databases based on the parameters, and display one or more results of such query.

6. The system of claim 5 wherein the one or more transit data databases may comprise one or more of route databases, asset databases, schedule adherence databases and trips databases.

7. The system of claim 6 wherein the one or more functionality modules may comprise one or more of route planning, asset monitoring, schedule adherence and trip planning modules.

8. The system of claim 1 wherein the module selector contains one or more icons representing one of the one or more functionality modules, each icon being selectable or not selectable and wherein, if selectable, the functionality module can be placed on the preview webpage.

9. The system of claim 1 wherein the webpage design module further comprises a sink target user interface component configured to allow the operator to select the one or more transit data sinks that should receive the webpage.

10. A method for configurable transit agency content management comprising:

receiving a request to design a webpage for a transit agency by selecting one or more functionality module user interface components to be placed on a webpage preview displayed on a screen wherein the functionality module user interface components are different for each of the transit data sinks, based on the screen size of the transit data sink, and a user of the transit data sink, and the webpage preview is not exposed to one or more transit data sinks;

determining what transit datasets the agency has access to;

allowing one or more functionality modules, each functionality module requiring one or more transit datasets for operation, to be selected and placed on the preview webpage based on if the determining indicated the agency has access to the transit datasets required by the functionality module;

receiving customization parameters relating to the functionality module and adjusting the appearance and operation of the functionality module based on the parameters; and publish the webpage based on the webpage preview that is exposed to the one or more transit data sinks wherein the publishing further comprises allowing the selection of the one or more transit data sinks to expose the webpage to.

11. The method of claim 10 further comprising placing a functionality module on the webpage preview based on a user action.

12. The method of claim 10 wherein the publishing further comprises allowing the selection of the one or more transit data sinks to expose the webpage to.

13. The method of claim 12 further comprising receiving customization parameters relating to the functionality module and adjusting the appearance and operation of the functionality module based on the parameters.

* * * * *